US009768964B2

(12) United States Patent
Brachetti (10) Patent No.: US 9,768,964 B2
(45) Date of Patent: Sep. 19, 2017

(54) CERTIFIED IDENTIFICATION SYSTEM AND METHOD

(71) Applicant: SOCIAL NATION S.R.L., Milan (IT)

(72) Inventor: Livio Brachetti, Milan (IT)

(73) Assignee: SOCIAL NATION S.R.L., Milan (IT)

( * ) Notice: Subject to any disclaimer, the term of this patent is extended or adjusted under 35 U.S.C. 154(b) by 26 days.

(21) Appl. No.: 14/688,943

(22) Filed: Apr. 16, 2015

(65) Prior Publication Data

US 2015/0304111 A1   Oct. 22, 2015

(30) Foreign Application Priority Data

Apr. 17, 2014  (EP) .................................... 14425047

(51) Int. Cl.
*H04L 9/32* (2006.01)
*G06F 21/34* (2013.01)
*G06Q 20/40* (2012.01)

(52) U.S. Cl.
CPC ............ *H04L 9/3234* (2013.01); *G06F 21/34* (2013.01); *G06Q 20/40* (2013.01)

(58) Field of Classification Search
CPC ........ G06F 21/34; G06Q 20/40; H04L 9/3234
See application file for complete search history.

(56) References Cited

U.S. PATENT DOCUMENTS

2004/0083173 A1* 4/2004 Reddihough .......... G06Q 20/02
                                                    705/41
2008/0255992 A1* 10/2008 Lin ...................... G06Q 20/24
                                                    705/44
2011/0022838 A1* 1/2011 Shaikh ................ H04L 63/0823
                                                    713/156
(Continued)

FOREIGN PATENT DOCUMENTS

EP       2 530 552       12/2012

OTHER PUBLICATIONS

1—Extended Search Report & Written Opinion issued for U.S. Appl. No. 14425047.9 filed on Apr. 17, 2014 in the name of Social Nation S.R.L. Mail date: Nov. 11, 2015.

*Primary Examiner* — Joseph P Hirl
*Assistant Examiner* — Sayed Beheshti Shirazi
(74) *Attorney, Agent, or Firm* — Steinfl + Bruno LLP (57) ABSTRACT

A certified identification system for a subject is described. The system has a certification station configured to issue first identification means representing the subject, second identification means, suitable for identifying at least one identification station, and configured to be associated with the subject, wherein the identification station is configured to combine the identification means and the first code of the second identification means, issuing a unique identification code comprising first data, a second code and a first code, wherein the identification station (4) further includes an encapsulation module configured to encapsulate the identification data so that they are presented as compact data. The certification station further includes an interpretation module configured to interpret the compact data, one or more from among first, second and third comparison modules, and a certification module configured to activate a permission for access to the certification station to manage operations with certified identity.

24 Claims, 5 Drawing Sheets

(56) References Cited

U.S. PATENT DOCUMENTS

| | | | |
|---|---|---|---|
| 2011/0283340 A1* | 11/2011 | Ganesan | G06F 21/36 726/4 |
| 2012/0209749 A1* | 8/2012 | Hammad | G06Q 30/06 705/27.1 |
| 2013/0246810 A1* | 9/2013 | Orsini | G06F 11/1076 713/192 |
| 2013/0290270 A1* | 10/2013 | Pareek | G06F 17/30011 707/687 |
| 2014/0067492 A1* | 3/2014 | Turner | G06Q 20/145 705/13 |
| 2014/0123170 A1* | 5/2014 | Kummer | H04N 21/2347 725/31 |
| 2014/0143146 A1* | 5/2014 | Passanha | G06Q 20/40 705/44 |
| 2014/0282993 A1* | 9/2014 | Van Till | H04L 63/08 726/9 |
| 2015/0006386 A1* | 1/2015 | Tebbe | G06Q 20/3274 705/44 |
| 2015/0269559 A1* | 9/2015 | Inotay | G06Q 20/3274 705/44 |
| 2016/0019510 A1* | 1/2016 | Guntupalli | G06Q 20/3274 705/43 |

* cited by examiner

Fig. 5

CERTIFIED IDENTIFICATION SYSTEM AND METHOD

CROSS REFERENCE TO RELATED APPLICATIONS

The present application claims priority to EP application 14425047.9 filed on Apr. 17, 2014, which is incorporated herein by reference in its entirety.

FIELD

The present disclosure relates to a certified identification system.

The present disclosure relates furthermore to a certified identification method. Even more particularly, the present disclosure relates to an online certified identification system/method.

BACKGROUND

There are known certified identification systems.

The systems currently used, for example by banks (internet banking), require users to certify their identity at the time they establish their relationship with the bank by physically presenting their identifying documents (identity card, driving license, passport) and also by signing the agreement to use online services.

Security for online identification is usually implemented using various systems such as: the use of a password or token consisting of a device issued by the certifying body with defined time codes, and possibly reinforced with physiognomic recognition measures, such as, for example, fingerprint readers and others known at the technological state of the art in this field.

The use of these online identification systems is recognised by the legislation of various countries, but currently these systems can be used only for operations or actions performed with the body which issued the certification.

To the knowledge of the inventors, there does not exist a system, method or methodology which permits a single certified identification to be valid for a plurality of different bodies or for uses other than those pre-established by the certifying body and in any case they must always be for activities to be performed with the certifying body.

It follows that a person interested in carrying out certified operations must be identified with each body that provides a specific certification.

In other words, the certification is tied to the person who is acting, in combination with a particular single certifying body.

Furthermore, if a certifying body were to decide, by common agreement with another body, to share the information on the certified identity of individuals, it would be obliged to adapt its own system to make it compatible with the other system.

This makes it substantially impossible to have flexible and efficient data sharing. Each body has its own computer system; modifying such a system to make it compatible with another inevitably gives rise to a weakening of the security requirements peculiar to each system, causing a possible leak in the security which a certified identity must, on the contrary, guarantee.

Currently, in Italy, a Prime Ministerial Decree awaiting approval defines the compliance and delivery modes for a Public Digital Identity Service (SPID). In this service, which will be provided if approved within the pre-ordained time, a citizen who wishes to obtain a Digital Identity will have to apply to one of the accredited Digital Identity operators. In order to be able to provide a Digital Identity, the operator will have to proceed with a "strong" recognition of the citizen, through a face-to-face check.

This service is, at the very least, limited as a result of this characteristic, since it seems that the only way that has been found to identify a subject with certainty is direct recognition through the physical presence of the person concerned. In other words, any certifying body must have had at least one "face-to-face" recognition.

Furthermore, based on what is currently public knowledge, the structure and operating modes of the service seem to be the classic bureaucratically (and therefore also technically) complex solution typical of a public administration.

SUMMARY

The applicant has perceived that the known approach must be radically changed in order to put the subject of an independent certificate supplier at the centre of the certified identification and to make the operation of certification as technological and flexible as possible, compatible with the necessary security requirements. This would guarantee the security of the identification data and complete reliability of the operation of certification, independently of the certifying body.

On the basis of the foregoing, a certified identification system and method which resolve the above problems and overcome the disadvantages of the prior art are disclosed.

A certified identification system and method which is efficient and, at the same time, simple to implement are further disclosed.

A certified identification system and method which are both flexible to use, on the part of a user of the service, are furthermore disclosed.

A certified identification system and method which are not tied to a single specific certifying body are furthermore disclosed.

A certified identification system and method enabling obtainment of the certified identity are furthermore disclosed.

An efficient certified identification system and method capable of providing results in times which are definitely shorter than the known solutions are furthermore disclosed.

In a first aspect, a certified system for identifying a subject is disclosed, wherein the system comprises:
  a certification station configured to issue first identification means representing the subject;
  second identification means, comprising a first code, assigned by said certification station, wherein said first code is suitable for identifying at least one identification station, said second identification means being configured to be associated with said subject;
  an identification station configured to identify said subject depending on said first identification means and said second identification means,
wherein said identification station is configured to combine said identification means and said first code of said second identification means by issuing a unique identification code comprising:
  first data representing said subject comprised in a database in said identification station;
  a second code representing the identification means of said subject issued by said certification station;
  said first code identifying said second identification means;

wherein the unique identification code comprises an encrypted QR code;
wherein said identification station comprises:
an identification module configured to generate identification data representing an identification that has been made;
an encapsulation module configured to encapsulate the identification data in such a way that they are presented as compact data;
wherein said certification station comprises a web platform configured to manage operations with certified identity, wherein said certification station comprises a second processing unit, in turn comprising:
an interpretation module configured to interpret said compact data, thus extracting one or more from among:
said first data;
said second code;
said first code;
at least one from among a first comparison module, a second comparison module and a third comparison module, wherein:
said first comparison module is configured to:
compare said first code with first identification codes of said second identification means;
generate a third confirmation signal in case of correspondence between said first code and a first identification code;
said second comparison module is configured to:
compare said second code with second identification codes of said identification means issued by said certification station;
generate a fourth confirmation signal in case of correspondence between said second code and an identification code;
said third comparison module is configured to:
compare said first data representing said subject with second data representing said subject;
generate a fifth confirmation signal in case of correspondence between said first data and said second data;
a certification module configured to:
detect one or more of said confirmation signals, if generated;
activate a flag representing permission to access said web platform configured to manage operations with certified identity, following authentication by means of a dedicated access module;
wherein said certification station comprises a database, associated with said second processing unit, and configured to contain at least said second data representing subjects;
wherein said second processing unit comprises said access module connected to said database, wherein said access module is configured to allow access by said subject (100) to said web platform depending on recognition of corresponding second data in said database and depending on an activated state of said flag.
In a second aspect, a certified identification method for identifying a subject is disclosed, comprising the steps of:
issuing, by means of a certification station, first identification means representing said subject;
preparing second identification means, comprising a first code, assigned by said certification station, wherein said first code is suitable for identifying at least one identification station;
identifying said subject depending on said first identification means and said second identification means using an identification station;
combining, by means of said identification station, said identification means and said first code of said second identification means, issuing a unique identification code comprising:
first data representing said subject comprised in a database of said identification station;
a second code representing the identification means of said subject issued by said certification station;
said first code identifying said second identification means;
wherein the unique identification code comprises a encrypted QR code;
generating identification data representing an identification that has been made;
encapsulating the identification data in such a way that they are presented as compact data;
by means of said certification station
acquiring said compact data;
interpreting said compact data, thus extracting at least
said first data;
said second code;
said first code;
comparing said first code with first identification codes (MI) of said second identification means;
generating a third confirmation signal in case of correspondence between said first code and a first identification code (MI);
comparing said second code (2) with second identification codes of said identification means issued by said certification station;
generating a fourth confirmation signal in case of correspondence between said second code and an identification code;
comparing said first data representing said subject with second data representing said subject;
generating a fifth confirmation signal in case of correspondence between said first data and said second data;
detecting said confirmation signals, if generated;
activating a flag representing permission to access a web platform configured to manage operations with certified identity, following authentication by means of a dedicated access module;
preparing a database, associated with said certification station, configured to contain at least said second data representing said subjects;
allowing access by said subject to said web platform, by means of said access module connected to said database, depending on recognition of corresponding second data in said database and depending on an activated state of said flag.
In a third aspect, a non-transitory computer readable medium is disclosed, comprising a computer program which, when run on a computer, implements at least one or more of the steps of the method.
Further aspects of the present disclosure are described in the claims.
Some embodiments of the present disclosure allow achievement of the following technical effects:
obtainment of a secure and unique certified identity;
a flexible obtainment system independent of the particularities of the national public administration and of the legislation, for all legislations which have a mechanism for conferring a certified identity for online use;

a certified identity is associated with the user; in other words, the user becomes "owner" of their own certified identity; the certified identity is unique and secure.

the certified identity, once obtained, is usable independently of the specific certifying body;

the certified identity is valid for all users of systems which utilise the method according to present disclosure; in other words, all suppliers of services which require a certified identity can register with the system according to present disclosure to guarantee their service to the users certified by the system.

In other words, the invention, in some of its embodiments, allows for a plurality of technical advantages compared with the known solutions.

In particular, the technical effects achieved are to be considered "further technical effects" in view of the fact that the object of the present disclosure creates a sequence of concretely and technically achievable operative steps/modules which perform a plurality of concrete functions.

Furthermore, the present disclosure provides for the generation of data deriving from processing of primary data representing specific technical characteristics such as, for example but not solely, encoding of technically identifiable means of identification. This processing provides consistent and substantial results, such as the identification of a subject or the activation of access to an area of personal data following identification.

The object of the present disclosure proves to be efficiently usable to provide results in reduced times compared with the prior art.

In more detail, a system/method is disclosed that may be used to enable a certified and, in particular, online identity to be obtained, which is valid for multiple uses and applications both by users and by "content providers" or operators who offer users their computer platforms or their online goods and services.

Once this online identity has been obtained through the method/system of the present disclosure, the host or citizen or body will obtain, by means of the platform described in the present disclosure, a certified identity valid for all the users of the systems which use the method of the present invention.

The present disclosure envisages creating an internet platform using the HTTPS protocol to create a virtual environment which is considered a private access, using security levels and differentiated recognition which allow the user to connect in a unique and certified manner.

The objective is thus to make access to information or bodies which require a certified identity, for performing the actions or operations desired by the user, transversal and international.

The system/method of the present disclosure is the result of the sum of the interactions of various technologies aimed at the unique certification of a digital identity so as to make it easy to use and with a low economic impact.

Once the Certified Identity has been obtained, the citizen will be able to choose the security level at which to maintain it, according to their own requirements, in fact within the platform of the disclosure.

It will therefore be possible, if required to use various tools, to modify the level of security of access.

The platform guarantees that the certifying body is not aware of what the user wants to do with the identity and is therefore not responsible (i.e is released from liability) for the use of the certified identity.

In the prior art, by contrast, the certifying body offers the service directly and manages the services desired by the user; as a result, it is responsible for these actions.

In fact, in the prior art, the body is dependent on the particularities of the national public administration.

In the present disclosure, the responsibility for the use of the certified identity therefore remains solely and exclusively with the user who is the sole legal owner of the identity.

More generally, with the system/method of the present disclosure, the certified online identity would be made independent of the details of the legislation of one nation and a single certifying body would be sufficient, making it no longer necessary to have a multiplicity of certifying bodies, such as banks, notaries, the public administration etc.

Furthermore, authorisations would not be necessary in order to apply it, without distinction, at an international level, since the already existing agreements are sufficient.

The security levels which the system will be capable of guaranteeing to the user will be directly proportional to the level of privacy.

This solution also implies the exclusion of "content providers" from the general obligation of surveillance: once a person is identifiable, they will be personally responsible for any offence committed online, relieving the platform where the offence was committed from the obligation of surveillance (one need only think of the comments in online newspapers and so forth), and this therefore provides a considerable incentive for content providers to adopt the system.

The method/system as disclosed also makes it possible to offer the services of third parties and to perform actions with the certified identity without any need to modify or supplement the system of the certifying body. The interaction costs and the costs for extending the service to several bodies are thus negligible and activation is simple and immediate, as well as free of charge.

The system and the method as disclosed also envisage in their applications software connectors to third parties which offer services or products or that require actions for which the certified identification is useful or necessary. The activation of these software connectors will be carried out to permit the user to interact with third parties and they will have no need to integrate with the third parties' computer systems, but only to make the certifications which have been communicated as previously described available to the third parties.

The object of the present disclosure can conveniently perform a service of centralising the data linked to a unique code for each body or for categories to which the person belongs (ex. pensioner, student, home-owner, motor vehicle, health, etc.), thereby allowing a convenient exploitation both by the public administration and by the private citizen.

The technical effects/advantages mentioned and other technical effects/advantages of the present disclosure will emerge in more detail from the description, given below, of an embodiment illustrated by way of non-limiting example with reference to the attached drawings.

DETAILED DESCRIPTION

According to an embodiment of the present disclosure, the certified identification system for a subject 100 comprises: a first certification station 1, configured to issue first identification means 2 representing the subject 100, second identification means 3, suitable for identifying at least one identification station 4 and configured to be associated with the subject 100, wherein the identification station 4 comprises a certification request module 411, a payment module 412, and an identification module 413 configured to generate a unique identification code (UID) to be associated with the second identification means 3, depending on detection of a request and payment having been made correctly, and to generate identification data UID_ID representing an identification that has been made, wherein the unique identification code UID comprises first data D1, a second code 2 and a first code 31, wherein the first certification station 1 further comprises an interpretation module 112 configured to interpret compact data S6, a first 113, second 114 and third 115 comparison module, and a certification module 116 configured to activate a permission for access to the first certification station 1 in order to manage operations with certified identity depending on comparisons made by one or more of the first 113, second 114 and third 115 comparison modules.

Figure 1:
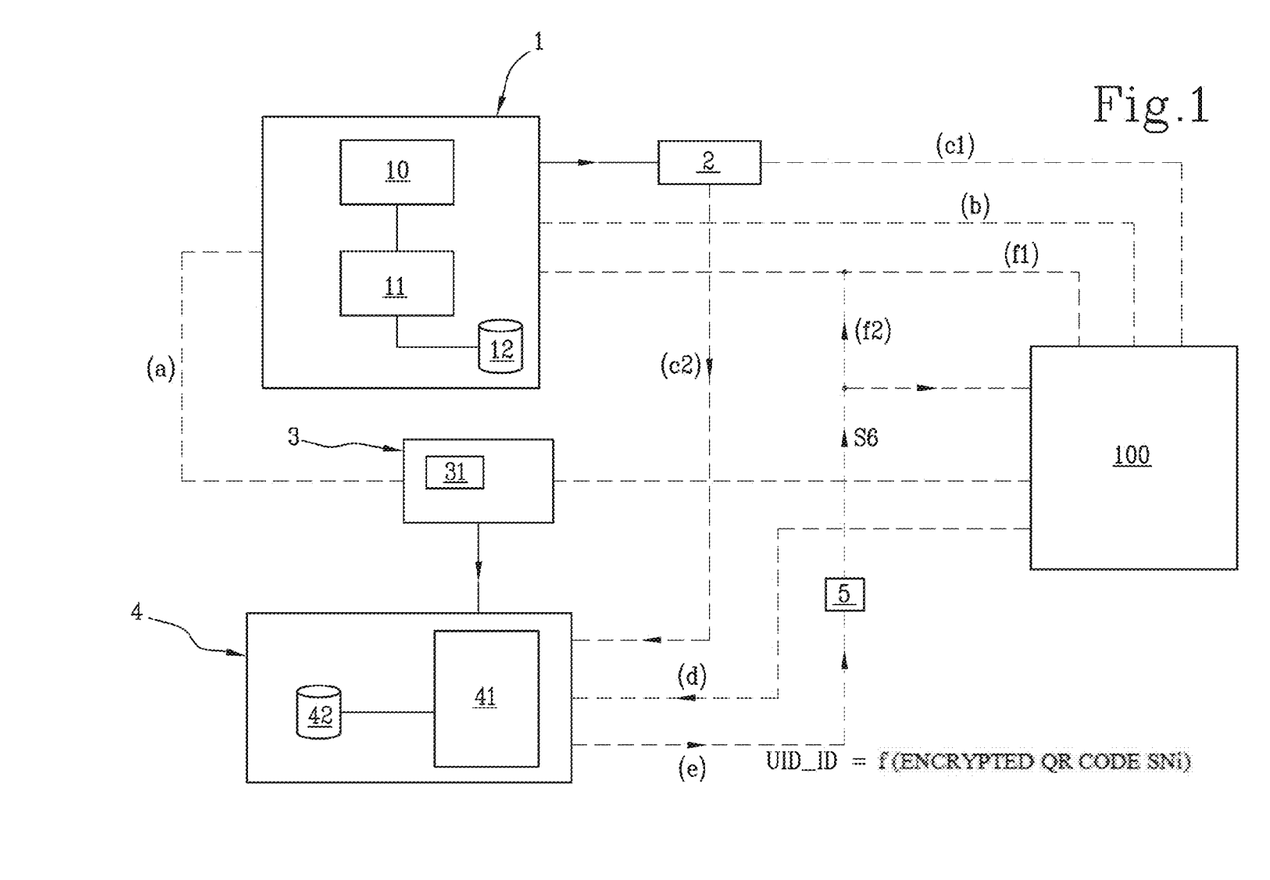
FIG. 1 is a rough block diagram according to one embodiment of the present disclosure.

With reference to FIG. 1, the certified identification system according to the present disclosure comprises a certification station 1.

The certification station 1 comprises a web platform 10 configured to manage operations with certified identity.

Preferably, it is carried out through a web platform using the HTTPS protocol in order to create a virtual environment, which is treated as a private access, using security levels and differentiated recognition which allow the user to connect in a unique and certified manner.

The first certification station comprises a second processing unit 11.

The second processing unit 11 comprises a registration module 117 (FIG. 4) configured to register the subject 100 and thus causes second data D2 representing the subject 100 to be generated.

The first certification station 1 comprises a database 12, associated with processing unit 11 and configured to contain at least the aforesaid second data D2 representing the subject 100. (In FIG. 1, the registration is indicated by step (b)).

In addition, the database 12 can also contain one or more identification codes from among first identification codes MI of the second identification means 3 and second identification codes CI of the identification means 2 described below.

Hereinafter, when reference is made to "at least the data D2", this will mean that reference can be made to the data D2 alone or the data D2 with at least the addition of one or more identification codes from among the first identification codes MI and second identification codes CI.

Advantageously, according to an embodiment of the present disclosure, the database 12 is dynamic and configured to store at least the aforesaid second data D2 representing the subject 100.

Figure 2:
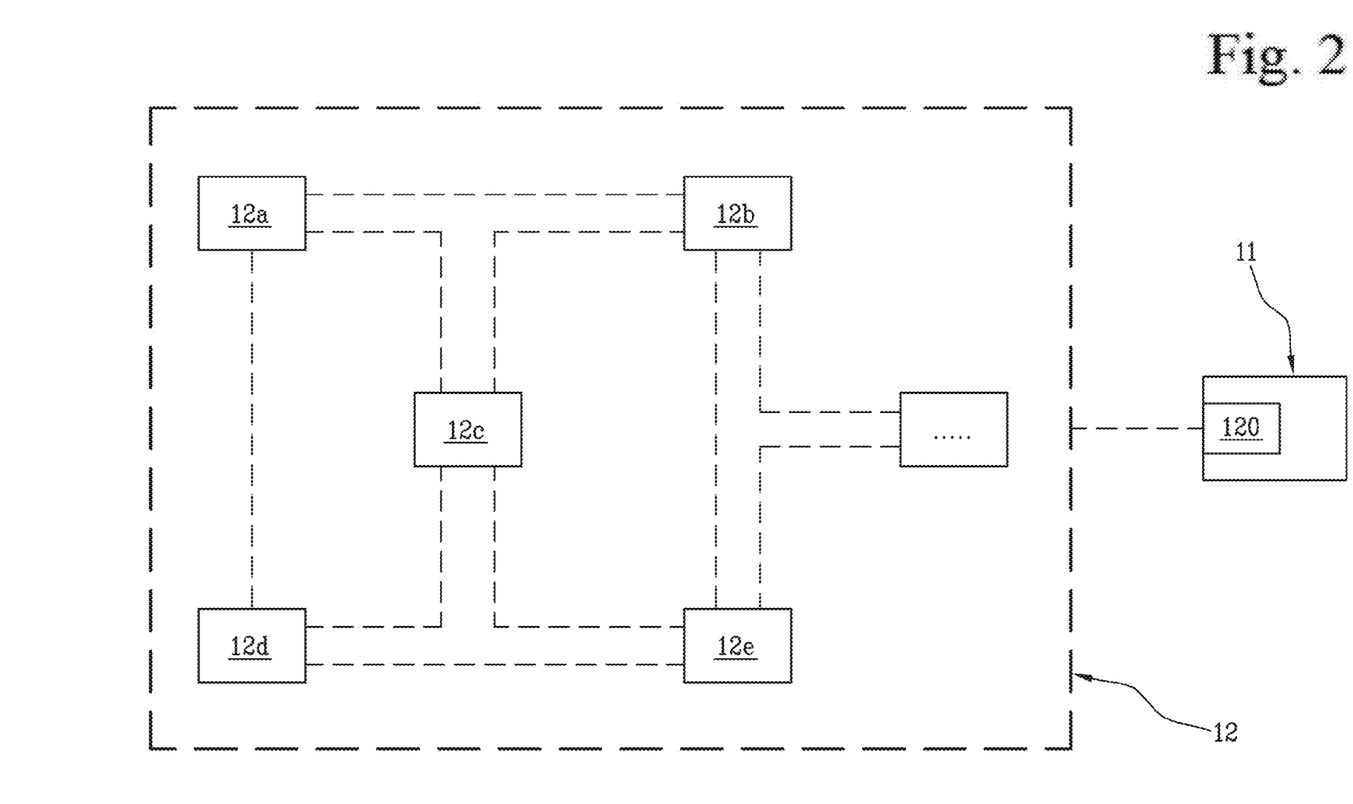
FIGS. 2, 3, 4 and 5 are block diagrams of details of FIG. 1.

With reference to FIG. 2, the dynamic database 12 comprises a plurality of storage locations 12*a*, 12*b*, 12*c*, 12*d* and 12*e*.

The dynamic database 12 is configured to store at least the data D2 in a variable distributed mode in the plurality of storage locations 12*a*, 12*b*, 12*c*, 12*d* and 12*e*.

With particular reference to FIG. 2, the plurality of storage locations 12*a*, 12*b*, 12*c*, 12*d*, 12*e*, etc. is locally or remotely distributed, wherein at least the data D2 are stored.

Preferably, the dynamic database 12 is configured to store at least the data D2 in a variable distributed mode.

Preferably, the distribution of the data is variable, at least depending on time.

The processing unit 11 comprises a distribution module 120, configured to manage the distribution of at least the data D2 in the dynamic database 12.

The distribution module 120, upon the generation of at least the data D2, is configured to activate a variable R1 for randomly locating the data D2 within the different storage locations 12*a*, 12*b*, 12*c*, 12*d* and 12*e*.

In other words, once the data D2 has been generated, the distribution module 120 determines a generation of random numbers associated with the respective storage locations 12*a*, 12*b*, 12*c*, 12*d* and 12*e*, thus determining a sequence over time of predefined storage locations in which the data D2 will be temporarily stored.

In still other words, the data D2 is located according to a first random time sequencing criterion C1.

As an alternative or in addition, the dwell time in each location can be made random by activating another generator of random numbers R2, associated with subsequent dwell times in a randomly generated storage location.

In other words, the distribution module 120, upon the generation of at least the data D2, is configured to activate a variable R2 for generating random dwell times of the data D2 within the different storage locations 12*a*, 12*b*, 12*c*, 12*d* and 12*e*.

In still other words, the data D2 are timed in the various locations according to a second random timing criterion C2.

As an alternative or in addition, the data D2 can also be fragmented according to a third random data fragmentation criterion C3.

In other words, the distribution module 120, upon the generation of at least the data D2, is configured to activate a variable R3 for generating a random fragmentation of the data D2 within the different storage locations 12*a*, 12*b*, 12*c*, 12*d* and 12*e*.

Advantageously, according to an embodiment of the present disclosure, the data contained in the database 12 can be distributed according to one or more of the three described criteria C1, C2 and C3, so that the data generated at the start can be regenerated only on the basis of the aforesaid criteria C1, C2 and C3.

In other words, the processing unit 11 comprises a distribution module 120 associated with the database 12 and configured to manage the distribution of at least the data D2 in the dynamic database 12 depending on one or more variables from among:

- a variable R1 for generating a random move of at least the data D2 within the different storage locations 12*a*, 12*b*, 12*c*, 12*d* and 12*e*;
- a variable R2 for generating random dwell times of the data D2 within the different storage locations 12*a*, 12*b*, 12*c*, 12*d* and 12*e*;
- a variable R3 for generating a random fragmentation of the data D2 within the different storage locations 12*a*, 12*b*, 12*c*, 12*d* and 12*e*.

The technical effect guaranteed by the application of even only one of the established distribution criteria is an increase in the security of the stored data.

The application of more than one of the criteria among those described increases the security of the data. The joint application of the three criteria guarantees a substantial inaccessibility to the data by non-authorised/non-certified third parties.

Advantageously, according to an embodiment of the present disclosure, the processing unit 11 is configured to activate the distribution module 120, depending on the generation of at least the second data D2 having taken place.

The technical effect achieved is the immediate distribution of the data D2, so that it may be made inaccessible as soon as it are generated.

In one example of operation, when the data D2 is generated, the processing unit 11 activates the distribution module 120, which manages the activation of the dynamic criteria of the database 12.

For example, criterion C1 determines that the data D2 will be moved in the following sequence of locations: location 12a-location 12c-location 12e, location 12b and location 12d.

Criterion C2 determines that the time intervals for the relocation are, respectively, 5 sec., 10 sec., 15 sec., 5 sec. and 7 sec.

Criterion C3 determines that the data D2, before being relocated, is fragmented according to a predefined fragmentation program.

In the preferred embodiment of the present disclosure, to access the certified identity service on the web platform 10, the user must preferably connect to a predefined website on a specific registration page. A registration interface will require four fields to be completed: Username, Password, email address and a CAPTCHA.

After completion of these fields, a response module will send an email to the address entered by the user, which will contain a link to the website to confirm the new user.

In this way, the subject 100 is registered at the certification station with a basic type of registration.

With the basic type of registration, the web platform 10 will be usable in a very limited manner. In fact, the possible use thereof will be limited to the user's own room (dedicated area on the web platform); it will impossible to create other rooms or zones. It will not be possible to access the public administration section, nor will it be possible to purchase services or products. It will only be possible to connect to a limited number of rooms and only in 'listening' mode.

Returning now to the specific description of the system of the present disclosure, one technically important characteristic is that the structure of this system, which allows a certificated identification of a subject 100, comprises a plurality of actors who cooperate in a coordinated and efficient way.

The certification station 1 is configured to issue first identification means 2 representing the subject 100.

Preferably, the first identification means 2 may comprise either or both:
- the token for identifying the person (2 letters and 4 numbers), which was provided immediately after the creation of the user;
- a valid document complete with: type and number of the document, first name and last name, date of birth, place of birth, tax reference number, complete residential address (street, house number, flat number, city, province, country), ID of identifier and mobile phone number.

In the preferred embodiment, the first identification means 2 comprises an identification token.

In other words, in the preferred embodiment, after the subject 100 has sent the confirmation to the certification station 1 (step indicated as (b) in FIG. 1), the subject 100 will be provided (step indicated as (C1) in FIG. 1) with a personal identification token assigned to their identity, made up of two letters and four numbers, randomly generated without substitutions. They will also find personal information fields of a basic type to be filled in and activation of the user just created will be completed.

The subject 100, at the first login, will be redirected to a page in which there will be a presentation of the potentialities of the site. There will also be a brief explanation of the importance of completing the personal information section as precisely and exhaustively as possible (ex. first name, last name, address, tax reference, date of birth, ID of identifier).

Obviously, it will always be possible to alter the details or re-access the introductory page.

In fact, advantageously, according to an embodiment of the present disclosure, the system must provide an environment in which the security of a person's identity is a fundamental matter and no certification operation is possible without first completing the necessary certified identification steps specific of the object of the present disclosure.

To this end, the disclosed certified identification system comprises an identification station 4, configured to identify the subject 100 depending on the first identification means 2 and second identification means 3.

Preferably, the second identification means 3 comprises an electronic recognition card.

Preferably, the second identification means 3 comprises a first code 31, assigned by the certifying station, wherein the first code 31 is suitable for identifying at least one identification station 4, wherein the identification means 3 is configured to be associated with the subject 100.

In other words, the second identification means 3 is configured to be associated with the subject 100.

The second identification means 3 comprises a first code 31, assigned by the certification station.

Preferably, the first code 31 comprises a unique serial number. The first code 31 is suitable for identifying at least one identification station 4.

Summarising, a certification station 1 assigns to the identification means 3 the first code 31, which is suitable for identifying at least one identification station 4.

Preferably, this assignment takes place by means of a connection between the certification station 1 and the identification station 4, as indicated by step (a) in FIG. 1.

In a preferred embodiment of the present disclosure, an identification station 4 is a bank or other body endowed with the same legally recognised functions, for example, a company investing in securities (SIM).

As an alternative or in addition, the identification station 4 is a totem structure with a pedestal and body provided with means for interacting with a user. In particular, such means comprises video recording and a display means to enable the functions provided by the identification station.

As an alternative or in addition, the identification station 4 is a portable unit designed for recognition of the subject.

Advantageously, according to the disclosure, the synergies which develop with the national and international banking (or similar) system are important. Each banking chain which decides to join will be provided with a series of electronic cards (second identification means 3) represented by a unique serial number (first code 31) (step (a) in FIG. 1).

These electronic cards are comparable to the rechargeable cards in the mobile phone system, in which a bank (identification station 4) must combine the code entered by the user (identification token 2) and the code issued by the certification station 1 (first code 31) for each card (second identification means 3), issuing an encrypted QR identification code (otherwise known as a QR Code) complete with personal data.

In other words, the identification station 4 is configured to combine the code entered by the user (identification token 2) and the code issued by the certification station 1 (first code 31) for each card (second identification means 3), issuing a unique identification code UID consisting of an encrypted QR code.

Advantageously, in the system of the invention, identification does not rely solely on the reading of a QR code, but also on the interpretation/decrypting of the code.

The technical effect achieved is that of guaranteeing maximum security of the data contained.

Alternatively, the identification station 4 can issue a so-called DataMatrix, which, since it can be replicated in quadratic fashion, can potentially contain an unlimited amount of information.

This alternative solution can be particularly convenient when biometric detection systems are integrated into portable systems (mobile phones, tablets, notebooks), enabling the transmission of first name, last name, address, etc. together with a bitstream identifying the fingerprint, rather than the photo of the retina or anything else. The same bitstream will be transmitted by the portable (or fixed) system with which the customer is accessing the certification system.

When the subject 100 decides to definitively certify their details on the certification station 1, they will contact the branch of the identification station 4 (for example, their bank), or connect online, and make the request (step (d) in FIG. 1).

The subject 100 will access the certification station 1 to carry out the operations relating to completion of their identification and the corresponding certification.

To allow this, the identification station 4 comprises a first processing unit 41.

In general, it should be noted that, in the present context and in the subsequent claims, the first processing unit 41 and the second processing unit 11 (described below) will be presented as being split into distinct functional modules (storage modules or operative modules) for the sole purpose of describing their functionalities clearly and completely.

In actual fact, these processing units can consist of a single electronic device, suitably programmed to perform the functions described, and the different modules can correspond to hardware entities and/or software routines that are part of the programmed device.

As an alternative or in addition, such functions can be performed by a plurality of electronic devices over which the aforementioned functional modules can be distributed.

The processing units can make use of one or more processors for executing the instructions contained in the storage modules.

The aforementioned functional modules can also be distributed over different local or remote computers, depending on the architecture of the network in which they reside.

The first processing unit 41 is configured to process data representing identifications of subjects 100.

Figure 3:
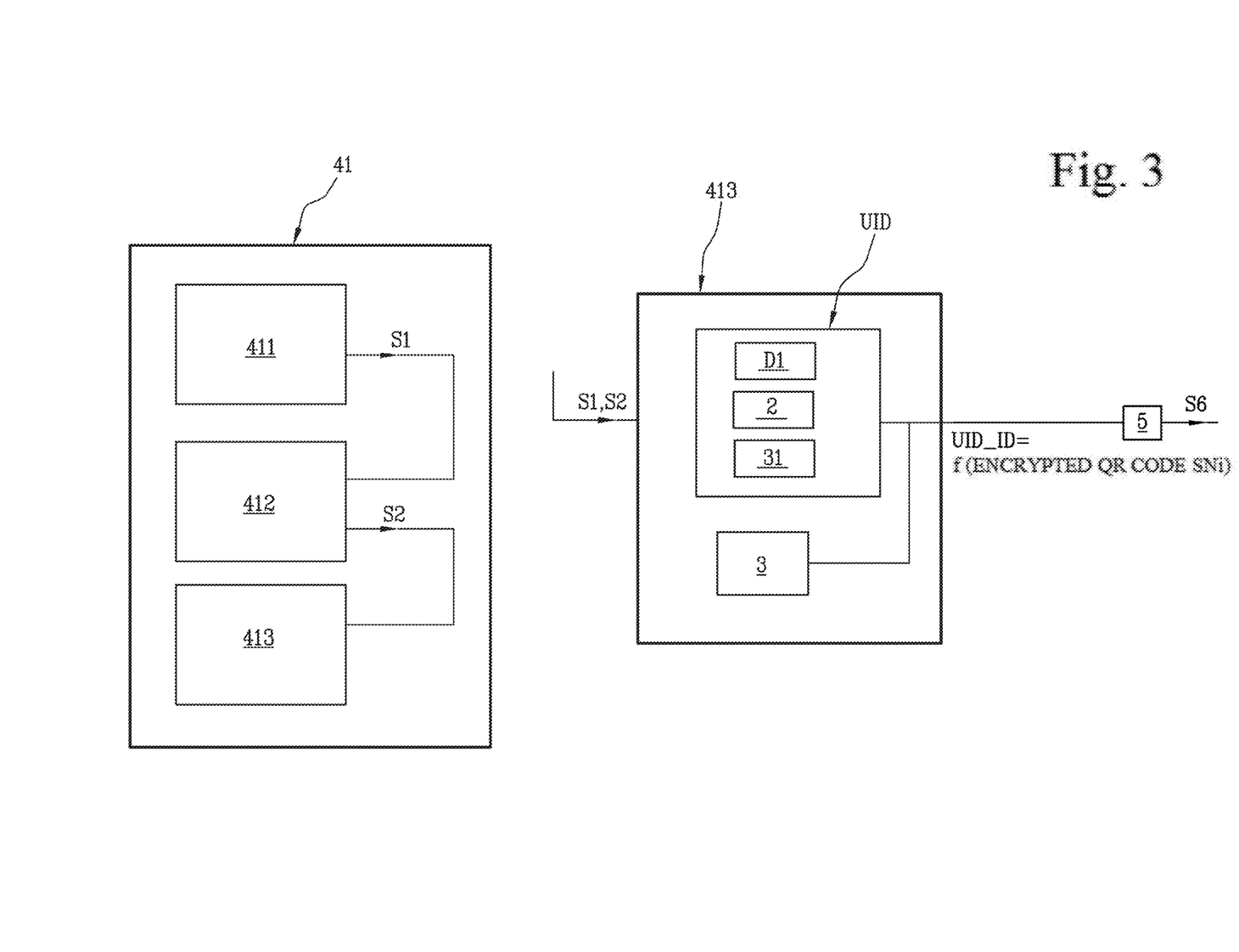

According to present disclosure, the first processing unit 41 comprises, for this purpose, a certification request module 411 (FIG. 3).

The certification request module 411 is configured to request a certification and generate a first confirmation signal S1 in case of a correct request.

In other words, the subject 100 starts a certification request procedure and, through the module 411, the system analyses the requests and generates a confirmation signal if the request has been correctly made.

The first processing unit 41 comprises furthermore a payment module 412 (FIG. 3) configured to acquire either the second identification means 3 or said unique identification code (UID) and to generate a second confirmation signal S2 in the event that payment is successfully made.

In other words, through the module 412, the subject 100 acquires either the second identification means 3, in particular, an electronic recognition card, or said unique identification code (UID). Through this module, the system checks the payment and generates a confirmation signal if the payment has been correctly made.

The first processing unit 41 comprises furthermore an identification module 413 (FIG. 3) configured to generate a unique identification code UID to be associated with the second identification means 3.

The identification module 413 associates the unique identification code UID with the second identification means 3, depending on detection of the first S1 and second S2 confirmation signals.

In other words, the module 413 checks that the certification request and the payment for either the electronic card or the unique identification code (UID) has been successfully made and consequently generates the unique identification code UID associated with the second identification means 3. In the event of the check having negative results, the module 413 interrupts the identification procedure.

The technical effect achieved is the security of certification of a certification procedure based on guaranteed data.

Advantageously, according to an embodiment of the present disclosure, the unique identification code UID comprises first data D1 representing the subject 100.

The identification station 4 comprises a database 42, in its turn, comprising the first data D1 representing the subject 100 registered with the identification station 4.

In other words, the database 42 is associated with the identification station 4 and comprises the first data D1 representing the subject 100 registered with the identification station 4.

The data D1 comprises all the personal data sufficient to identify the subject 100, but without the aid of an identification token. In other words, the identification station 4 comprises the data of the subject 100 because the subject has been identified in advance, but it has no trace of the identification token which the subject 100 received at the time of registration with the certification station 1.

In one embodiment, the identification station 1 is a bank and the subject 100 is a current account holder.

The unique identification code UID comprises furthermore a second code 2 representing the identification means 2 of the subject 100 issued by the certification station 1.

In a preferred embodiment, the identification means 2 comprises an identification token.

The unique identification code UID comprises furthermore the first identification code 31 of the second identification means 3.

In a preferred embodiment, the first code 31 comprises the serial number issued to the bank, identifying the electronic card.

In a preferred embodiment of the present disclosure, the unique identification code UID, generated by the identification module 413, comprises an encrypted QR code.

The technical effect achieved is that of guaranteeing maximum security of the data contained well beyond the simple encoding of data normally performed by means of QR codes. In fact, these codes enable only a particular compression of data, but can be read without any protection by any QR code reader.

The system of the present disclosure, in contrast, envisages adding an encryption to the QR code, so that the interpretation thereof also requires an operation of decrypting/interpretation before a reading operation.

The most important technical effect is that the resulting QR code, generated by the identification module 413, cannot be read by any existing system and becomes an actual "QR", i.e. quick response code only after having been decrypted/interpreted.

In a preferred embodiment of the present disclosure, an encrypted QR code SN is used.

The certification station 1 is configured to assign and transmit to each identification station 4 a specific algorithm which issues, in a random manner, a QR code of different profiles for each identification station 4.

In other words, the QR code of each identification station 4 has a different defined profile for each identification station 4.

In still other words, the certification station 1 is configured to assign to each identification station 4 an encrypted QR code SNi having a different profile Si, generated by means of an algorithm associated with each identification station 4. The algorithm will be run in the identification station 4 so as to generate the specific QR code of the identification station 4.

In other words, an interpretation unit 112 in the certification station 1 (also described below) is configured to interpret an encrypted QR code SNi, depending on the algorithm associated with each identification station 4 by the certification station 1.

The encrypted QR code SNi, according to the present disclosure guarantees, moreover, a large data containing capacity and 1024- or 2048-bit encryption of the encapsulated data, as described below.

The interpretation unit 112 is configured to decrypt the encrypted QR code SNi coming from each identification station.

Furthermore, the encryption algorithm is modified by the certification station at predefined time intervals.

In other words, the certification station 1 is configured to modify the encryption algorithm of each identification station 4 and to transmit the new algorithm to said station at predefined time intervals $\Delta T$.

Consequently, the interpretation unit 112 is configured to interpret an encrypted QR code SNi based on said predefined time intervals $\Delta T$.

From a structural viewpoint, the encrypted QR code SNi has various profiles with the circular-shaped identification points inside it.

The technical effect achieved is a better reading of the data contained.

The further technical effect of the module 413 is to identify a subject with a plurality of correlated codes, the combination of which guarantees certainty of the authenticity of the certification.

Advantageously, according to the present disclosure, the identification module 413 is further configured to generate identification data UID_ID, representing an identification which has been made.

The identification data UID_IDI represents an identification which has been made and comprises data representing a payment which has been made and the UID unique identification code.

In other words, the identification data UID ID is defined based on the encrypted QR code SNi.

An encapsulation module 5 encapsulates the identification data UID_ID so as to be presented as compact data S6 in a suitable mode for subsequent handling/processing.

As is well known, encapsulation is a property whereby data that defines the internal state of an object and the methods defining the logic thereof are made accessible only to the methods of the object itself, whereas they are not visible outside the object.

In order to alter the internal state of the object, it is necessary to invoke public methods, which is the main object of encapsulation.

In fact, if appropriately managed, it enables the object to be seen like a "black box", where, via the interface, it is known what it does but, not how it does it.

In the present disclosure, the identification data UID_ID is encapsulated in such a way as to be read only and in no way modified.

More precisely, according to Wikipedia, "Encapsulation is the packing of data and functions into a single component." The features of encapsulation are supported using classes in most object-oriented programming languages, although other alternatives also exist. It allows selective hiding of properties and methods in an object by building an impenetrable wall to protect the code from accidental corruption.

In programming languages, encapsulation is used to refer to one of two related but distinct notions and sometimes to the combination thereof:

1) A language mechanism for restricting access to some of the object's components.

2) A language construct that facilitates the bundling of data with the methods (or other functions) operating on that data".

In other words, the identification data UID_ID is encapsulated in such a way as not be accessed (and thus modified) by other components of the system or possible intruders.

The technical effect achieved is an increase in the security of this data against every type of manipulation aimed at violating confidential and/or sensitive information.

In particular, the presentation of the identification data UID_ID is in no way dependent on the process of encapsulation implemented by the encapsulation module 5. The presentation is simply a mode whereby such data is proposed to the user of the system irrespective of how the data is generated and/or modified.

The system of the present disclosure allows the achievement of a joint technical effect deriving from the use of encrypted QR codes and data encapsulation, security and inviolability of data.

The requirement of security and inviolability of data in the system of the present disclosure is a fundamental feature for ensuring that the personal identity is certified.

To date, this feature is not used in any system of certified identity.

In a preferred embodiment of the present disclosure, this compact data S6 comprises a PDF document.

As an alternative or in addition, this data comprises a paper document.

In a preferred embodiment of the present disclosure, the identification module 413 is configured to generate the unique identification code UID by means of a 1024-bit encrypted algorithm, that is, by means of a CT encryption procedure, in particular at 1024 bits.

The encryption can be carried out using various CR encryption systems.

A first CR1 encryption system considered secure for the quantity of data required by the present disclosure, also taking account of a possible increase due to the transmission of biometric data, is AES—Advanced Encryption Standard.

This standard, also known as Rijndael, uses blocks fixed at 128 bits and keys fixed at 256 bits. Its encryption strategy is applied using a matrix calculation. It is a robust and safe system; it has also been adopted by the N.I.S.T. (National Institute of Standards and Technology). It has an advantage in that the ratio between the size of the encrypted text and the unencrypted text is close to 1.

A second CR2 encryption system is an asymmetric key system that it is proved to be particularly effective. The sender encrypts the data to be sent with the public key of the certification station. When the certification station reads the data from the QR Code or from the DataMatrix, it decrypts them with its private key. It is very practical and efficient, but it necessitates exposing the public key.

A third CR3 encryption system is the Vernam Cipher.

This is an encryption system described as a "perfect cipher". It is so described because it is capable of concealing the text in clear, excluding every kind of attack by cryptanalysis. This system provides for an encryption system using an encryption password once only. It has the disadvantage of requiring a different key to be published for every user certified.

Based on the foregoing, advantageously, according to the present disclosure, in the certified identification system, the QR code is encrypted based on a selectable encryption criterion CR1, CR2 and CR3.

Consequently, the interpretation module 112 is configured to interpret the encrypted QR code based on the selected encryption criterion CR1, CR2 and CR3.

Returning to the operation of the system of the present disclosure, after the subject has provided their own data and paid the sum specified for either the electronic recognition card 3 or the unique identification code (UID), the identification station will provide, in paper or electronic form (PDF file), the payment receipt including an encrypted QR code SNi. This encrypted QR code SNi contains within it, according to an algorithm encrypted, for example, an asymmetric key, all the data described above, plus a 12-digit PIN issued to the bank, identifying the electronic recognition card 3 associated with/allocated to the identification token 2 of the user 100.

Following the generation of the compact data S6, the subject 100 has met all the requirements for being able to certify their own identity.

The subject 100 must therefore connect to the certification station 1, wherein the second processing unit 11 is configured to certify the compact data S6 obtained (step f1) in FIG. 1).

In other words, as soon as the subject 100 loads the receipt for payment for either the electronic card 3 or the unique identification code UID onto the appropriate web page, including the encrypted QR code SNi issued by the identification station 4. Preferably by sending an email or by scanning this receipt, the subject 100 can be certified at the certification station 1.

For this purpose, advantageously, according to an embodiment of the present disclosure, the second processing unit 11 comprises an interpretation module 112 configured to interpret the compact data S6.

In a preferred embodiment, the module 112 performs an OCR scan of the data UID_ID.

The interpretation module 112 is configured to interpret the compact data S6, thus extracting at least:

the first data D1 representing the subject 100, from the database 42 of the identification station 4;
as has already been said, the data D1 comprises the personal data sufficient to identify the subject 100, but without the aid of an identification token; the second code 2 representing the identification means 2 of the subject 100 issued by the certification station 1, in which in particular the code 2 is the identification token associated with the subject in the process of registration by means of module 117;
the first code 31 identifying the second identification means 3.

The second processing unit 11 further comprises one or more modules from among: a first comparison module 113, a second comparison module 114 and a third comparison module 115.

In a preferred embodiment of the present disclosure, the second processing unit 11 comprises all three, the first comparison module 113, the second comparison module 114 and the third comparison module 115.

The first comparison module 113 is configured to compare the first code 31 with the first identification codes MI of the second identification means 3, in which these codes MI are preferably comprised in the storage module 12 associated with the processing unit 11.

In other words, the first comparison module 113 is configured to compare the first code 31 with predefined first identification codes MI.

The first comparison module 113 is configured furthermore to generate a third confirmation signal S3 in case of correspondence between the first code 31 and a recognised first identification code MI.

The guaranteed technical effect is the recognition of the electronic card used by the user.

The second comparison module 114 is configured to compare the second code 2 with second identification codes CI of identification means 2 issued by said certification station 1, wherein these identification codes CI are preferably comprised in the storage module 12 associated with the processing unit 11.

In other words, the second comparison module 114 is configured to compare the second code 2 with predefined second identification codes CI.

In other words, in the preferred embodiment, the identification token comprised in the compact data S6 must correspond to one of the identification tokens associated with the subjects 100 in the process of the registration that has taken by means of the registration module 117.

The second comparison module 114 is configured furthermore to generate a fourth confirmation signal S4 in case of correspondence between the second code 2 and a recognised identification means code CI.

The guaranteed technical effect is the recognition of the subject 100.

The third comparison module 115 is configured to compare the first data D1, representing the subject 100, with the second data D2, representing the subject 100, wherein these second data D2 is preferably comprised in the storage module 12 associated with the processing unit 11.

In other words, the third comparison module 115 is configured to compare the first data D1 with predefined second data D2 representing the subject 100.

The third comparison module 115 is configured furthermore to generate a fifth confirmation signal S5 in case of correspondence between the recognised first data D1 and second data D2.

The technical effect guaranteed is the exact correspondence of the requesting subject with the subject already registered in the system.

The second processing unit 11 comprises furthermore a certification module 116.

The certification module 116 is configured to detect one or more confirmation signals S3, S4 and S5, if generated.

In a preferred embodiment, the certification module 116 is configured to detect all the confirmation signals S3, S4 and S5, if generated.

The certification module 116 is configured furthermore to activate a flag Fg, representing a permission for access to the web platform 10, which is configured to manage operations with certified identity, following authentication.

The operations performed by the processing unit 11 can be summarised as follows: as soon as the upload of the identification data file UID_ID is completed, the interpretation module 112 will be launched automatically and it will interpret the data contained in the encrypted QR code assigned by the identification station 1. First of all, the 12-digit PIN issued by the identification station 1 and the serial number issued by the certification station 4 will be compared with the one contained in the database 12. The system will continue with the matching between the other data contained in the encrypted QR code and what was declared in the subject's profile. If the sender data correspond, the subject will be certified for all purposes and will have the possibility of fully exploiting the potentialities of the system of the present disclosure.

In the event that there is not a complete but a partial match, the system will contact the subject to obtain confirmation of some documents which can align this information.

The second processing unit 11 comprises furthermore an access module 118 (FIGS. 4 and 5) connected to the database 12.

Figure 4:
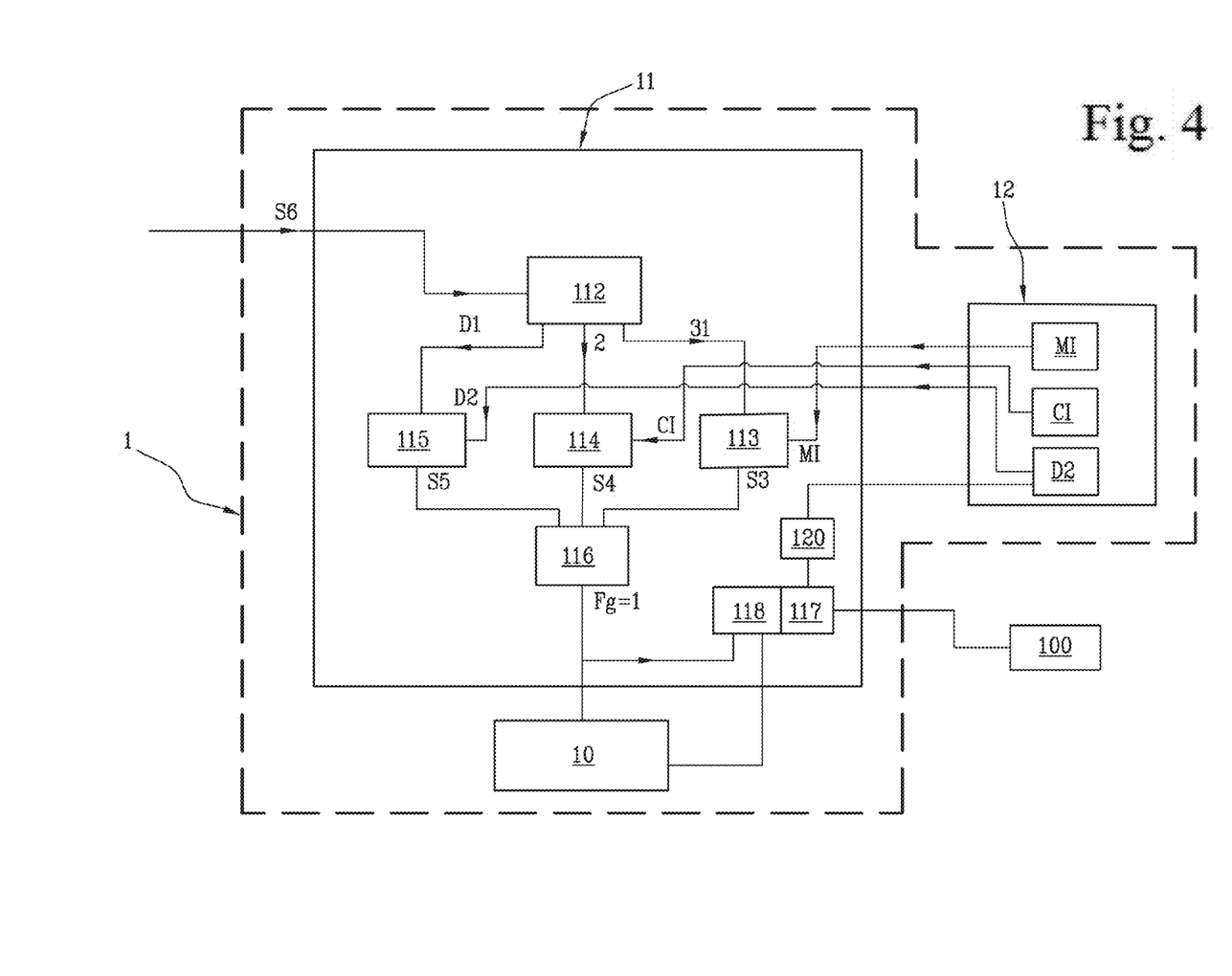
Figure 5:
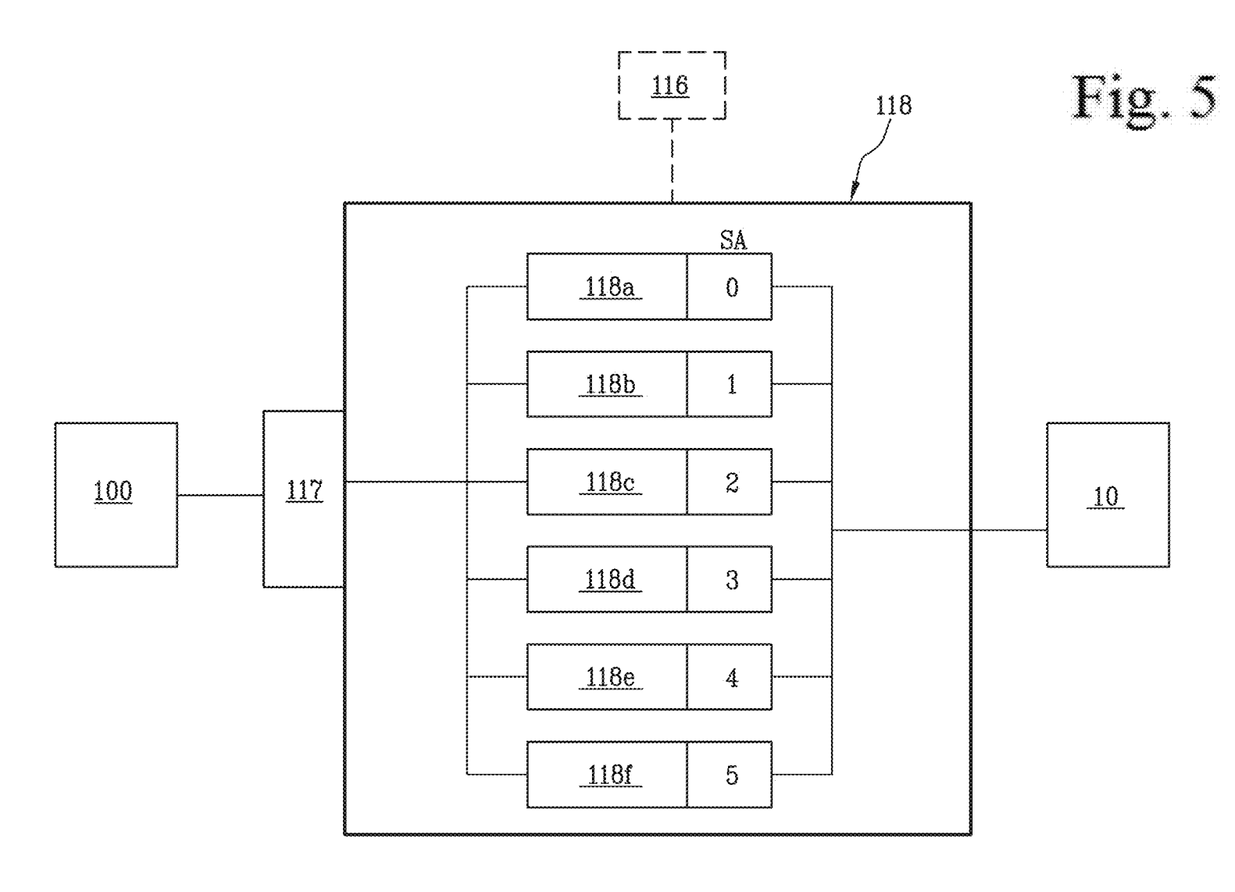

The access module 118 is configured to allow access by the subject 100 to the web platform 10, depending on recognition of the corresponding second data D2 in the database 12, mentioned above.

In other words, the access module 118 is configured to allow access by the subject 100 to the web platform 10, depending on an activated state of the flag Fg generated by the certification module 116 and representing permission to access the web platform 10, as described above.

The technical effect guaranteed is to guarantee access only to subjects already identified.

Preferably, the access module 118 comprises one or more of the following:
- username and password control systems 118a;
- geolocation and device control systems 118b;
- OTP or Token control systems 118c;
- paper control systems for national services 118d;
- biometric and RFID control systems 118e;
- biometric control systems with dedicated hardware 118f.

Advantageously, according to an embodiment of the present disclosure, the access control systems 118a, 118b, 118c, 118d, 118e and 118f create different degrees SA of security of access (SA).

The access control systems 118a, 118b, 118c, 118d, 118e and 118f are selectively activatable depending on the degree SA of security of access.

In other words, the applicant has verified that a certified identification system can define various degrees of security using one or more of the following parameters:
- something which represents what the user knows, for example, a password;
- something which represents what the user possesses, for example, an "authentication token";
- something which represents who the user is, for example, fingerprints, iris patterns etc.

To summarise, the certified identification can easily be made progressive, i.e. more stringent as regards security requirements.

In other words, the higher the degree of delicacy of the operation, the more necessary it will be to use a fully progressive certified identification.

Given the lack of homogeneity among subjects who will be able to exploit the disclosed system of the invention, a system is envisaged which makes it possible to have progressively more secure certification.

In other words, if a subject needs to have a higher level of security, they can have various levels of control which ensure the uniqueness of the user who is connecting.

According to an embodiment of the present disclosure, 5 different levels of access are provided:

Module 118a: A level=0: username and password

By entering the username and password only, without being a certified user, the subject can only partially access the functionalities made available on web platform 10.

Module 118b: SA level=1: geolocation and device

Besides entering the username and password, the user must register one or more devices, geolocating it/them (with a maximum of 5 areas and 5 devices).

The geolocation procedure takes place as follows: the login on web platform 10 must be made with the device to be geolocated and geolocation is activated. The system of the present disclosure will send an OTP (One Time Password) to the declared mobile number. If the password entered in the web platform 10 corresponds to the 0 T P received by SMS, the device is certified.

Module 118c: SA level=2: OTP or Token

Passing through the steps described in points 0 and 1, the user will receive an OTP at the declared mobile number each time they want to enter, as a certified user, the web platform 10.

Module 118d: SA level=3: national or other service cards.

Passing through the steps described in points 0, 1 and 2, the user will be able to use the services relating to their own competent public administration in order to be able to certify themselves online (system not yet active in any country).

Module 118e: SA level=4: Integrated common mass recognition systems (biometric and RFID, Apple Beacon)

Passing through the steps described in points 0, 1, 2, and 3, the user will be able to add or integrate a device available on the open market capable of biometric recognition.

For example, the iPhone 5 has an integrated fingerprint recognition device. Samsung has announced that it will integrate one into the next Galaxy S5. Currently, the Samsung Galaxy S4 has an integrated RFID reader. The possibility of developing applications for mobiles which provide an OTP should also not be ruled out.

Module 118f: SA level=5: Biometric recognition systems with dedicated hardware

Passing through the steps described in points 0, 1, 2, 3, and 4, the user will be able to use hardware installed on their own machine, thus exponentially increasing security levels (retina reading, fingerprints etc.).

Besides the system described, the present disclosure describes in addition a method of certified identification of a subject 100 performed by means of the previously shown system.

The method comprises the steps of:
- issuing, by means of an identification station 1, first identification means representing said subject 100;
- preparing second identification means 3, comprising a first code 31, assigned by the certification station, wherein the first code 31 is suitable for identifying at least one identification station 4;

identifying the subject 100 depending on the first identification means 2 and said second identification means 3 using an identification station 4;

by means of said identification station 4, requesting certification and generating a first confirmation signal S1 in case of a correct request;

acquiring the second identification means 3 for generating a second confirmation signal S2 in case of a payment successfully made;

generating a unique identification code UID to be associated with the second identification means 3, depending on detection of the first S1 and second S2 confirmation signals, wherein the unique identification code UID comprises first data D1 representing the subject 100 from the database 42 of the identification station 4, a second code 2 representing identification means 2 of the subject 100 issued by the certification station 1 and the first code 31 identifying the second identification means 3.

generating identification data UID_ID representing an identification which has been made.

The method comprises the steps, performed by means of the certification station 1, of:

acquiring the identification data UID_ID;

interpreting the identification data UID_ID, extracting therefrom one or more items from among the first data D1, the second code 2 and the first code 31;

comparing the first code 31 with the first identification codes MI of said second identification means 3 and generating a third confirmation signal S3 in case of correspondence between said first code 31 and a first identification code MI;

comparing said second code 2 with the second identification codes CI of the identification means 2 and generating a fourth confirmation signal S4 in case of correspondence between said second code 2 and an identification code CI;

comparing said first data D1 representing said subject 100 with the second data D2 representing said subject 100 and generating a fifth confirmation signal S5 in case of correspondence between said first data D1 and said second data D2;

detecting said one or more confirmation signals S3, S4, S5, if generated;

activating a flag Fg representing permission to access a web platform 10 configured to manage operations with certified identity, following authentication.

The method of certified identification, according to an embodiment of the present disclosure, comprises all of the steps implemented by the above-specified components of the system.

The certified identification method, according to the present disclosure, can be implemented by means of an electronic computer.

The present disclosure comprises furthermore a non-transitory computer medium comprising a computer program which, when run on a computer, implements one or more of the steps of the method described or the functionalities of the modules described in the system.

Some embodiments of the present disclosure allow achievement of the following advantages:

simplicity economy transversality of the systems the combination of existing and free systems choice of the degree of security up to the largest systems.

The system/method of the present disclosure can be advantageously applied to petitions, online referendums, surveys, dialogue with the public administration, car-sharing, student/teaching management, exchange of used goods, barter, sale and assessment of the service produced, company intranets, condominium management, televoting etc.

The invention claimed is:

1. A certified identification system for a subject comprising:

a hardware certification station configured to issue first identification means representing said subject;

second identification means, comprising a first code, assigned by said hardware certification station, wherein said first code is suitable for identifying at least one identification station, said second identification means being configured to be associated with said subject;

an identification station configured to identify said subject depending on said first identification means and said second identification means;

wherein said identification station is configured to combine said first identification means and said first code of said second identification means, issuing a unique identification code comprising:

first data representing said subject comprised in a database in said identification station;

a second code representing said second identification means of said subject issued by said hardware certification station;

said first code identifying said second identification means; wherein the unique identification code comprises an encrypted QR code;

wherein said identification station comprises:

an identification module configured to generate identification data representing an identification that has been made;

an encapsulation module configured to encapsulate the identification data in such a way that they are presented as compact data;

wherein said hardware certification station comprises a web platform configured to manage operations with certified identity, wherein said hardware certification station comprises a second processing unit, in turn comprising:

an interpretation module configured to interpret said compact data, thus extracting one or more from among:

said first data;

said second code;

said first code;

least one from among a first comparison module, a second comparison module and a third comparison module, wherein:

said first comparison module is configured to:

compare said extracted first code with first code of said second identification means;

generate a third confirmation signal in case of correspondence between said extracted first code and said first code of said second identification means;

said second comparison module is configured to:

compare said extracted second code with second code of said unique identification code issued by said identification station;

generate a fourth confirmation signal in case of correspondence between said extracted second code and said unique identification code;

said third comparison module is configured to:
compare said first data representing said subject with second data representing said subject;
generate a fifth confirmation signal in case of correspondence between said first data and said second data;
a certification module configured to:
detect one or more of said confirmation signals, if generated;
activate a flag representing permission to access said web platform configured to manage operations with certified identity, following authentication by a dedicated access module;
wherein said hardware certification station comprises a database, associated with said second unit, and configured to contain at least said second data representing subjects;
wherein said second processing unit comprises said dedicated access module connected to said database, wherein said dedicated access module is configured to allow access by said subject to said web platform depending on recognition of corresponding second data in said database and depending on an activated state of said flag.

2. The certified identification system according to claim 1, wherein said first identification means comprise a personal identification token associated with said subject.

3. The certified identification system according to claim 1, wherein said database comprises a plurality of storage locations.

4. The certified identification system according to claim 3, wherein said database is dynamic and configured to store at least the data in a variable distributed mode in the plurality of storage locations.

5. The certified identification system according to claim 3, wherein said second processing unit comprises a distribution module associated with the dynamic database and configured to manage the distribution of at least the data in the dynamic database depending on one or more from among
a variable for generating a random move of at least the data within the different storage locations;
a variable for generating random dwell times of at least the data within the different storage locations;
a variable for generating a random fragmentation of the data within the different storage locations.

6. The certified identification system according to claim 4, wherein said second processing unit comprises a distribution module associated with the dynamic database and configured to manage the distribution of at least the data in the dynamic database depending on one or more from among
a variable for generating a random move of at least the data within the different storage locations;
a variable for generating random dwell times of at least the data within the different storage locations;
a variable for generating a random fragmentation of the data within the different storage locations.

7. The certified identification system according to claim 1, wherein said QR code is encrypted based on a selectable encryption criterion.

8. The certified identification system according to claim 7, wherein the interpretation module is configured to interpret said encrypted QR code based on the selected encryption criterion.

9. The certified identification system according to claim 1, wherein said hardware certification station is configured to assign to each identification station an encrypted QR code of a different profile generated by an algorithm associated with each identification station, and said interpretation module is configured to interpret said encrypted QR code depending on the algorithm associated with each identification station by the hardware certification station.

10. The certified identification system according to claim 8, wherein said hardware certification station is configured to assign to each identification station an encrypted QR code of a different profile generated by means of an algorithm associated with each identification station, and said interpretation module is configured to interpret said encrypted QR code depending on the algorithm associated with each identification station by the hardware certification station.

11. The certified identification system according to claim 9, wherein the hardware certification station is configured to modify an encryption algorithm of each identification station and to transmit the new algorithm to that station, at predefined time intervals $\Delta T$ and the interpretation module is configured to interpret said encrypted QR code based on said predefined time intervals $\Delta T$.

12. The certified identification system according to claim 10, wherein said hardware certification station is configured to modify an encryption algorithm of each identification station and to transmit the new algorithm to that station, at predefined time intervals $\Delta T$ and
the interpretation module is configured to interpret said encrypted QR code based on said predefined time intervals $\Delta T$.

13. The certified identification system according to claim 1, wherein said second processing unit comprises a registration module configured to register said subject, thus causing generation of said second data representing said subject.

14. The certified identification system according to claim 1, wherein said access module comprises one or more among:
username and password control systems;
geolocation and device control systems;
OTP or Token control systems;
paper control systems for national services;
biometric and RFID control systems;
biometric control systems with dedicated hardware.

15. The certified identification system according to claim 14, wherein said username and password control systems; geolocation and device control systems; OTP or Token control systems; paper control systems for national services; biometric and RFID control systems; biometric control systems with dedicated hardware; create different degrees of security of access and are selectively activated depending on said degree of security of access.

16. The certified identification system according to claim 1, wherein said identification station comprises one among:
a bank;
a totem structure provided with means for interacting with a user;
an investment company;
a portable unit designed for the recognition of said subject.

17. The certified identification system according to claim 1, wherein said second identification means comprise a recognition card.

18. The certified identification system according to claim 1, wherein said first code comprises a unique serial number.

19. The certified identification system according to claim 1, wherein said identification station comprises a first processing unit in turn comprising a certification request module configured to request a certification and generate a first confirmation signal in case of a correct request;

a payment module configured for the purchase of either second identification means or said unique identification code, and for the generation of a second confirmation signal in case of a successfully made payment;

an identification module configured to generate said unique identification code to be associated with said second identification means, depending on the detection of said first and second confirmation signal.

20. The certified identification system according to claim 16, wherein said identification station comprises a first processing unit in turn comprising a certification request module configured to request a certification and generate a first confirmation signal in case of a correct request;

a payment module configured for the purchase of either second identification means or said unique identification code, and for the generation of a second confirmation signal in case of a successfully made payment;

an identification module configured to generate said unique identification code to be associated with said second identification means, depending on the detection of said first and second confirmation signal.

21. The certified identification system according to claim 1, wherein said identification data representing an identification that has been made comprise data representing a payment made and said unique identification code.

22. A certified identification method for a subject comprising the steps of:

i) issuing, by a hardware certification station, first identification means representing said subject;

ii) preparing second identification means, comprising a first code, assigned by said hardware certification station, wherein said first code is suitable for identifying at least one identification station;

iii) identifying said subject depending on said first identification means and said second identification means using an identification station;

iv) by said identification station combining said first identification means and said first code of said second identification means, issuing a unique identification code comprising:

first data representing said subject comprised in a database of said identification station;

a second code representing said second identification means of said subject issued by said hardware certification station;

said first code identifying said second identification means; wherein the unique identification code comprises an encrypted QR code;

generating identification data representing an identification which has been made;

encapsulating the identification data so as to be presented as compact data;

v) by means of said hardware certification station:

acquiring said compact data;

interpreting said compact data; thus extracting at least said first data;

said second code;

said first code;

comparing said extracted first code with said first code of said second identification means;

generating a third confirmation signal in case of correspondence between said extracted first code and said first code of said second identification means;

comparing said extracted second code with said second code of said unique identification code issued by said identification station;

generating a fourth confirmation signal in case of correspondence between said extracted second code and said unique identification code issued by said identification station;

comparing said first data representing said subject with second data representing said subject;

generating a fifth confirmation signal in case of correspondence between said first data and said second data;

detecting said confirmation signals, if generated;

activating a flag representing permission to access a web platform configured to manage operations with certified identity, following authentication by a dedicated access module;

preparing a database, associated with said hardware certification station, configured to contain at least said second data representing said subjects;

allowing access by said subject to said web platform, by said dedicated access module connected to said database, depending on recognition of corresponding second data in said database and an activated state of said flag.

23. The certified identification method according to claim 22, wherein said method is implemented by an electronic computer.

24. A non-transitory readable medium comprising a computer program which, when run on a computer, implements one or more of the steps of the method of claim 22.

* * * * *